United States Patent [19]
Keesman

[11] Patent Number: 5,122,877
[45] Date of Patent: Jun. 16, 1992

[54] METHOD OF TRANSMITTING A DIGITAL VIDEO SIGNAL AND A RECEIVER FOR USE IN THE METHOD

[75] Inventor: Gerrit J. Keesman, Eindhoven, Netherlands

[73] Assignee: U.S. Philips Corporation, New York, N.Y.

[21] Appl. No.: 576,329

[22] Filed: Aug. 31, 1990

[30] Foreign Application Priority Data

Oct. 23, 1989 [NL] Netherlands .................. 8902612

[51] Int. Cl.⁵ .............................................. H04N 7/13
[52] U.S. Cl. ...................................... 358/135; 358/133
[58] Field of Search ...................... 358/133, 138, 135

[56] References Cited

U.S. PATENT DOCUMENTS

| | | | |
|---|---|---|---|
| 4,703,352 | 10/1987 | Kondo | 358/135 |
| 4,710,811 | 12/1987 | Kondo | 358/138 |
| 4,729,021 | 3/1988 | Kondo | 358/135 |
| 4,802,006 | 6/1989 | Kondo | 358/135 |
| 4,903,124 | 2/1991 | Hoshi et al. | 358/133 |

Primary Examiner—John W. Shepperd
Assistant Examiner—Minsun Oh
Attorney, Agent, or Firm—Edward W. Goodman

[57] ABSTRACT

For the transmission of a digital video signal via a transmission medium (11) consecutive pictures of N×M picture elements are subsivided into sub-pictures, a sub-picture being asembled from n×m picture elements. The maximum value and the minimum value ($U_{max}$, $U_{min}$) of a video signal component associated with the picture elements in a sub-picture are determined. In addition, the amplitudes of a video signal component associated with the picture elements in the sub-picture are quantized with a given number of p bits, by means of subdividing the dynamic range (DR) of the video signal component within this sub-picture, into $2^p$ equal sub-ranges. At the receiver end dequantization is effected in the following manner. On dequantization, a value which is equal to the said maximum value ($U_{max}$) is assigned, for at least one of the picture elements in the sub-picture for which the signal component has the highest quantized amplitude ($U_{Qmax}$), to this (those) picture element(s), but in the event that there are two more of those picture elements, not to all those picture elements. For at least one of the picture elements in the sub-picture for which the video signal has the lowest quantized amplitude ($U_{Qmin}$), a value which is equal to the minimum value ($U_{min}$) is assigned to this (those) picture element(s) on dequantization, but not to all those picture elements in the event that there are two or more of those picture elements.

6 Claims, 3 Drawing Sheets

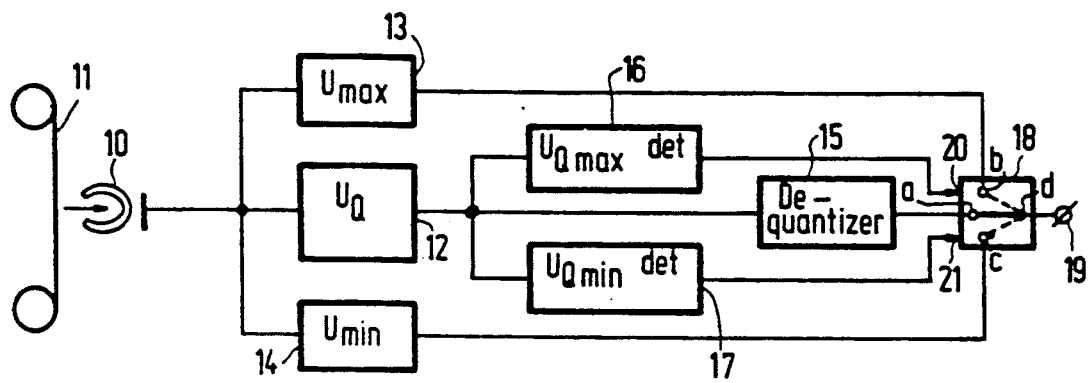
FIG. 7
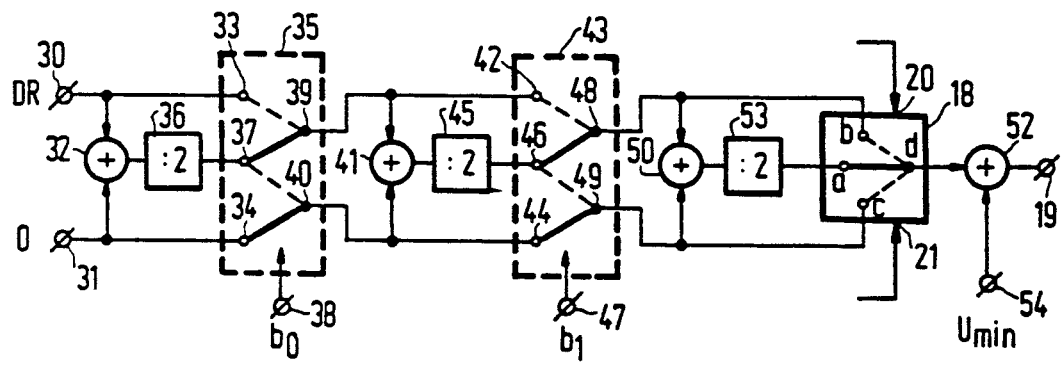
FIG. 8
| $b_0$ | $b_1$ | b | a | c |
|---|---|---|---|---|
| 0 | 0 | DR/4 | DR/8 | 0 |
| 0 | 1 | DR/2 | 3DR/8 | $\frac{1}{4}$ DR |
| 1 | 0 | 3DR/4 | 5DR/8 | $\frac{1}{2}$ DR |
| 1 | 1 | DR | 7DR/8 | 3DR/4 |
FIG. 9

METHOD OF TRANSMITTING A DIGITAL VIDEO SIGNAL AND A RECEIVER FOR USE IN THE METHOD

BACKGROUND OF THE INVENTION

1. Field of the Invention

The invention relates to a method of transmitting a digital video signal via a transmission medium, comprising a transmitter for transmitting and a receiver for receiving the digital video signal, in the transmitter:

- each picture of consecutive pictures of $N \times M$ picture elements being sub-divided into sub-pictures, a sub-picture being assembled from $n \times m$ picture elements, it holding for the product of n and m that it is greater than or equal to 4,
- for a sub-picture and for a video signal component associated with each one of the picture elements in the sub-picture, the maximum value and the minimum value this video signal component has in the sub-picture being determined with the object of obtaining the dynamic range of the video signal component for the picture elements in the sub-picture,
- the amplitudes of the video signal component in the sub-picture all being quantized by a given number of p bits by subdividing the dynamic range into $2^p$ of at least approximately equal sub-ranges,
- the quantized amplitudes of the video signal component for all the picture elements in the sub-picture and information about the minimum value and the maximum value of the video signal component in the sub-picture being applied to the transmission medium for transmission via the transmission medium, in the receiver:

- the information about the maximum and minimum values of the video signal component in the sub-picture, and the quantized amplitudes of the video signal component for all the picture elements in the sub-picture being received,
- the quantized amplitudes of the video signal component in the sub-picture being dequantized,
- the video information for consecutive pictures of $N \times M$ picture elements being derived for consecutive pictures, and a receiver for use in the method.

2. Description of the Related Art

The method of the type defined in the opening paragraph is disclosed in the U.S. Pat. No. 4,729,021. More specifically, FIG. 8 of said Patent shows how the method is performed. The video signal component to be encoded can, for example, be the luminance component or a chrominance component of the video signal. In a sub-picture, the maximum value ($U_{max}$) and the minimum value ($U_{min}$) of the video signal is determined. The difference between these two values then indicates the dynamic range (DR) of the video signal component in the sub-picture. The minimum value of the video signal component in the sub-picture can thereafter be subtracted from the amplitude of the video signal component associated with the picture elements in the sub-picture. The amplitudes A thus obtained are located in a range for which it holds that $0 \leq A \leq DR$. The amplitudes thus obtained are now quantized. If it has been ascertained that the amplitudes in the video signal component in the sub-picture are quantized by p bits, then the dynamic range is subdivided into $2^p$ equal sub-ranges (DB). Let p be equal to 2, then the dynamic range is divided into four equal sub-ranges. Amplitudes in the sub-range between 0 and ¼ DR are then represented by the binary number 00, amplitudes in the sub-range between ¼ DR and ½ DR by the binary number 01, amplitudes in the sub-range between ½ DR and ¾ DR by the binary number 10 and amplitudes in the sub-range between ¾ DR and DR are represented by the binary number 11.

Dequantization at the receiver end means that the binary number 00 is converted into an amplitude ⅛ DR, the binary number 01 is converted into an amplitude ⅜ DR, the binary number 10 is converted into an amplitude ⅝ DR and the binary number 11 is converted into an amplitude ⅞ DR. By thereafter adding the value $U_{min}$ to the dequantized values, the dequantized amplitudes for the decoded video signal component for the picture elements in the sub-picture are obtained.

SUMMARY OF THE INVENTION

The invention has for its object to provide a method and a receiver for use in the method in which dequantization is effected in a different manner.

According to the invention, the method is therefore characterized, in that in the receiver during dequantization of the quantized amplitudes of the video signal component associated with the $n \times m$ picture elements in the sub-picture, for at least one of the picture elements for which the video signal component has the highest quantized amplitude, and in the event there are two or more picture elements for which the video signal component has the highest quantized amplitude not for all of those picture elements, this quantized amplitude is, upon dequantization, taken equal to the maximum value of the video signal component in the sub-picture, and for at least one of the picture elements for which the video signal component has the lowest quantized amplitude, and in the event that there are two or more picture elements for which the video signal component has the lowest quantized amplitude not for all of those picture elements, this quantized amplitude is, upon dequantization, taken equal to the minimum value of the video signal component in the sub-picture.

Preferably, during dequantization of the quantized amplitudes of the video signal component associated with the $n \times m$ picture elements in the sub-picture, the amplitude for the video signal component of just one picture element having the largest quantized amplitude, is, upon dequantization, taken equal to the maximum value of the video signal component in the sub-picture, and that for precisely one of the picture elements for which the video signal component has the lowest quantized amplitude, the amplitude for the video signal component for that picture element is taken equal, on dequantization, to the minimum value of the video signal component in the sub-picture.

The invention is based on the recognition that the prior-art method of quantization and dequantization has a disadvantage if the video information is copied a number of times successively. Copying video information is inter alia effected with magnetic tape video recorders.

When a video program is copied only once from a first to a second video recorder, the digital video information recorded on the magnetic tape is read and in the first video recording dequantization is effected in the manner described in the foregoing. This results in that, after one reproducing step, the dynamic range, which prior to recording on the first video recorder was equal to DR, has now been reduced to ⅔ DR (= ¾ DR − ⅛ DR). This means a poor picture quality. Repeated copying causes the dynamic range to decrease after each copying operation and the amplitude of the video signal component for the picture element to change accordingly, which each time reduces the picture quality, which is of course undesirable.

If, according to the invention, an amplitude DR is assigned during dequantization to at least one of the picture elements for which the quantized amplitude of the video signal component is represented by the digital number 11, and an amplitude 0 is assigned, during dequantization, to at least one of the picture elements for which the quantized amplitude of the video signal component is represented by the digital number 00, it is achieved that after dequantization the dynamic range of the video signal component in the sub-picture has not changed. Repeated copying does not cause the amplitude of the video signal component for a picture element to change.

There is always at least one picture element for which the quantized amplitude of the video signal component is represented by the binary number 11. Likewise, there is also at least one picture element for which the quantized amplitude of the video signal component is represented by the binary number 00. There may of course be picture elements for which the quantized amplitude of the video signal component is represented by the binary number 00 or 11. In that case, on dequantization, the respective values 0 and DR will not be assigned to all these picture elements, so as to prevent that dequantization of the picture elements located in the lowest and the highest sub-range are disturbed to an excessive extent.

It should be noted that U.S. Pat. No. 4,727,021 illustrates a different quantization and dequantization method in FIG. 9. Using this prior art method, the dynamic range is indeed kept constant on dequantization, but on quantization, quantization is not effected in equal sub-ranges and additionally the respective values 0 and DR for the video signal component are assigned to all the picture elements in the lower and the upper sub-ranges. This ultimately results in a poorer picture quality than when the method according to the invention is used.

BRIEF DESCRIPTION OF THE DRAWINGS

The invention will now be described in greater detail with reference to a number of embodiments shown in the accompanying drawings. Herein:

FIG. 7 shows an embodiment of a receiver in the form of a device for reading video information;

FIG. 8 shows an embodiment of a two-bit dequantizer; and

FIG. 9 is a Table showing signal values present at the three outputs of this dequantizer for different two-bit binary numbers.

DESCRIPTION OF THE PREFERRED EMBODIMENTS

Figure 1:
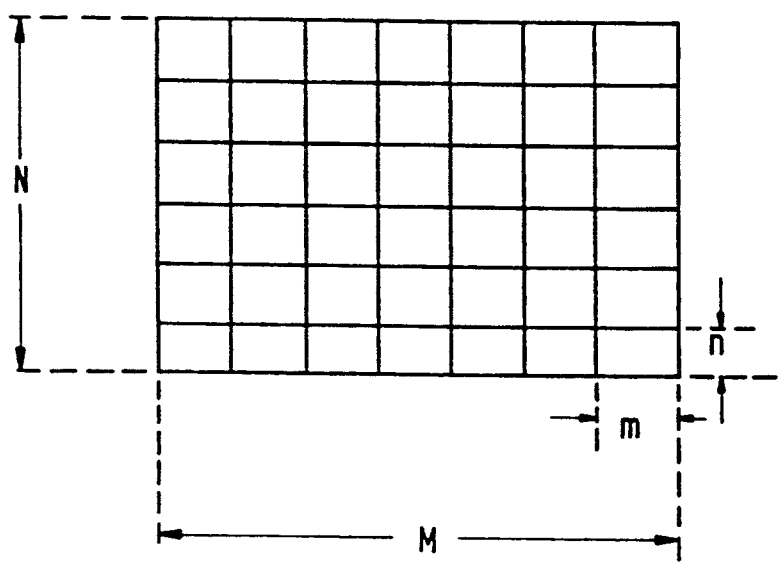
FIG. 1 shows the picture assembled from N×M picture elements.
Figure 2:
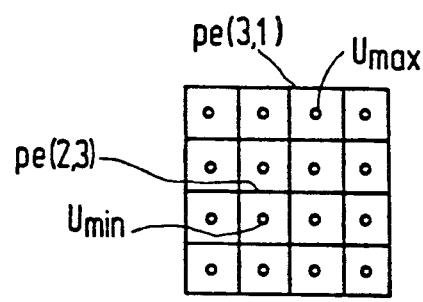
FIG. 2 shows a sub-picture assembled from n×m picture elements.

FIG. 1 shows a video picture assembled from N×M picture elements. Each sub-picture is assembled from n×m picture elements. For n and m, it holds that their product is greater than or equal to 4. FIG. 1 shows a division of the picture into sub-pictures of mutually different dimensions. This is however not absolutely necessary. FIG. 2 shows, for example, a sub-picture consisting of 4×4 picture elements. The video signal may have been assembled from a plurality of video signal components, such as: the luminance Y and the two chrominance difference signals R-Y and B-Y. A video signal component is available in the digital form as samples, each sample being associated with a picture element. Of the (16) samples of the video signal component in a sub-picture, the highest sample ($U_{max}$) and the lowest sample ($U_{min}$) are determined. In FIG. 2 the picture element pe (3, 1) appears to have the highest value $U_{max}$ and the picture element pe (2, 3) appears to have the lowest value $U_{min}$ for the video signal component in the sub-picture.

The difference $U_{max} - U_{min}$ indicates the dynamic range DR of the video signal component in the sub-picture.

Figure 3:
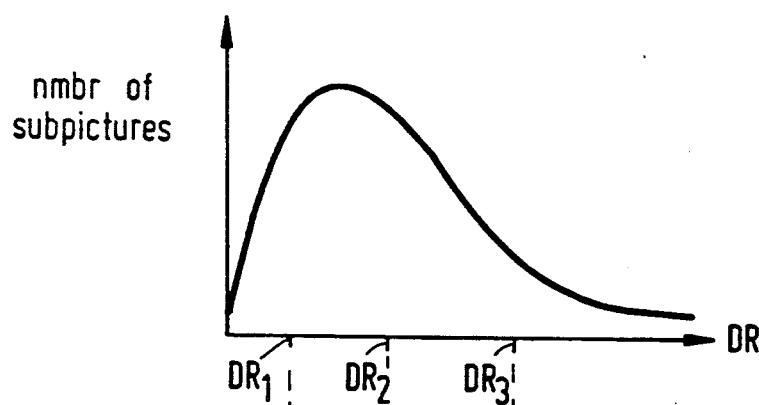
FIG. 3 shows the number of sub-picture elements in a picture expressed as a function of the dynamic range of the video signal component in a sub-picture.

FIG. 3 is a histogram in which, as a function of the dynamic range DR, the number of sub-pictures in a picture for which the video signal component has a certain dynamic range, are plotted.

Figure 4:
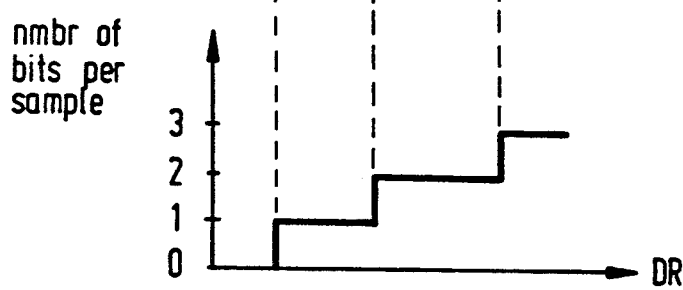
FIG. 4 shows the number of bit per sampling operation of the video signal component in a sub-picture, as a function of the dynamic range of the video signal component in the sub-picture.

FIG. 4 is a curve which indicates how many bits are used to quantize a sample of the video signal component associated with a picture element. FIG. 4 clearly shows that in sub-pictures having a dynamic range less than DR1, the samples are quantized with zero bits. Consequently no information of these sub-pictures is transmitted. In sub-pictures having a dynamic range of DR1 to DR2, the samples of the video signal components are represented by 1 bit. In sub-pictures having a dynamic range from DR2 to DR3 the samples of the video signal component are each represented by 2 bits. In sub-pictures having a dynamic range greater than or equal to DR3 the samples of the video signal components are each represented by 3 bits.

The value of DR1, DR2 and DR3 are chosen such that, after quantization, the appropriate bit rate for the signal to be transmitted via the transmission medium is obtained. The determination of the values for DR1, DR2 and DR3 is automatically effected in the quantizer.

Figure 5:
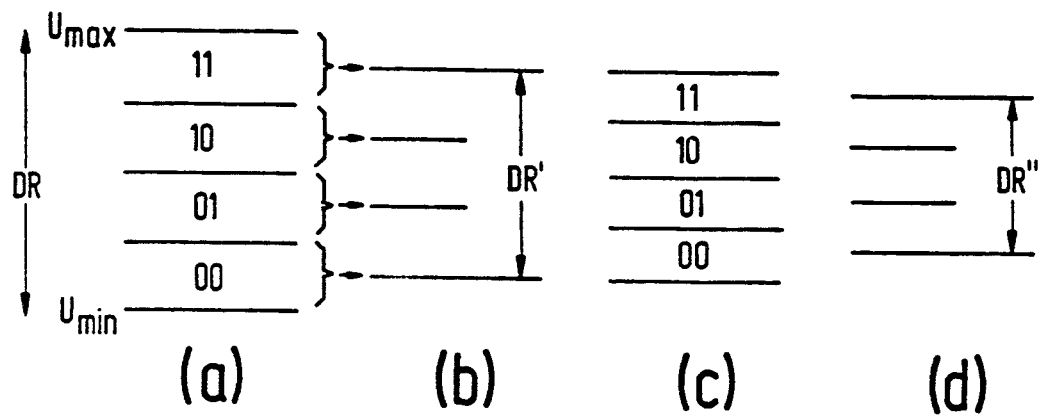
FIG. 5 illustrates a number of copying steps utilizing the prior-art quantization and dequantization methods.

The quantization in accordance with the method disclosed in the U.S. Pat. No. 4,729,021 is illustrated in FIG. 5. By way of example, a quantization to 2-bit binary numbers is shown. This implies that the dynamic range DR is divided into four equal sub-ranges, which is obvious from FIG. 5a, the binary number 00 is consequently assigned, after quantization to all sampling operations in the sub-picture having an amplitude A for which it holds that $U_{min} \leq A \leq U_{min} + DR/4$. Similarly, sampling operations in the sub-picture having an amplitude A for which it holds that $U_{min} + DR/4 \leq A \leq U_{min} + DR/2$ are given the binary number 01 after quantization.

The binary number 10 is assigned to samples having an amplitude A for which it holds that $U_{min}+DR/2 \leq A \leq U_{min}+3DR/4$. The binary number 11 is assigned to samples having an amplitude A for which it holds that $U_{min}+3DR/4 \leq A \leq U_{max}$.

FIG. 5b shows the video signal component in the sub-picture after dequantization. Samples corresponding to the binary number 00 are converted to an amplitude equal to $U_{min}+\frac{1}{8}DR$. Samples corresponding to the binary number 01 are converted to an amplitude equal to $U_{min}+3DR/8$. Samples corresponding to the binary number 10 are converted to an amplitude equal to $U_{min}+5DR/8$. Samples corresponding to the binary number 11 are converted to an amplitude equal to $U_{min}+7DR/8$. FIG. 5b clearly shows that the dynamic range DR' is now equal to $U_{max}-U_{min}-DR/4$. Consequently, the dynamic range is reduced by one quarter relative to the original dynamic range DR.

FIG. 5c shows a subsequent quantizing operation in which quantization is again effected with a 2-bit number. FIG. 5d shows the dequantization subsequent thereto. It is very obvious that the dynamic range DR" has again become smaller. This problem is met more specifically with one or a plurality of copying operations in the event of a video recorder. This causes the picture quality to deteriorate significantly.

Figure 6:
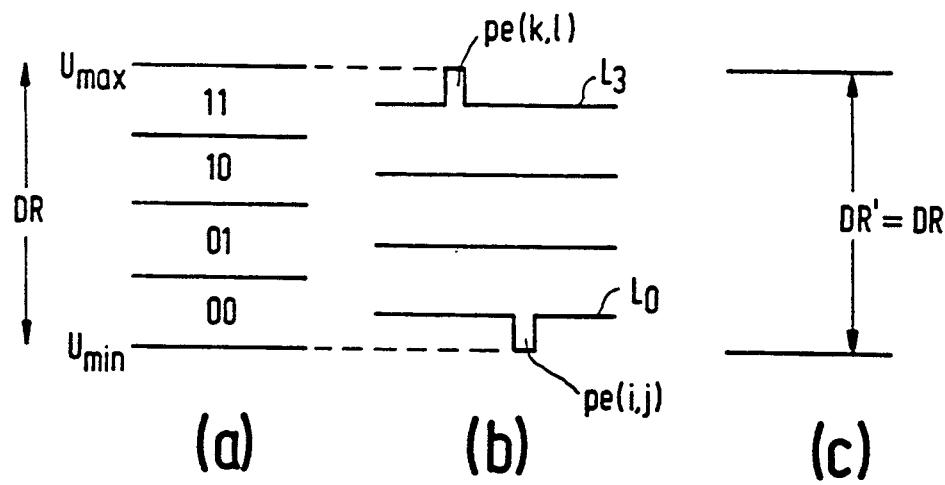
FIG. 6 shows a copying step utilizing the method according to the invention.

FIG. 6 illustrates the method of the invention. FIG. 6a again shows the quantization step to 2-bit binary numbers. FIG. 6b illustrates what now happens during dequantization. The samples corresponding to the binary numbers 01 and 10 are dequantized in known manner and the respective amplitudes $U_{min}+3DR/8$ and $U_{min}+5DR/8$ are assigned thereto.

There is always at least one sample which corresponds to the binary number 00. This is namely at least that sample associated with the picture element pe (2, 3) whose minimum value $U_{min}$ has been derived from the signal component in the sub-picture.

There is also always at least one sample corresponding to the binary number 11. This is namely at least that sample associated with the picture element pe (3, 1) whose maximum value $U_{max}$ has been derived from the signal component in the sub-picture.

The value $U_{min}$ is assigned on dequantization to at least one of all the samples corresponding to the binary number 00. This is shown schematically in FIG. 6b by means of the line $L_0$ which assumes the value $U_{min}$ for the picture element pe (i, j). pe (i, j) might be the picture element pe (2, 3), namely if there is only one sample corresponding to the binary number 00.

In accordance with the invention, the value $U_{min}$ could now be assigned to the first picture element in the sub-picture that is dequantized, and is represented by the binary number 00. This need not of necessity be the picture element pe (2, 3).

It would alternatively be possible to assign the value $U_{min}$ to more than one samples which is represented by the binary number 00 (if present). It is however a strict requirement that the value $U_{min}$ is not assigned to all the samples represented by the binary number 00. It would, for example, be possible to assign the value $U_{min}$ to not more than half of these samples, but it must be assigned to at least one of them.

Of all the samples represented by the binary number 11, the value $U_{max}$ is assigned to at least one of them on dequantization. This is schematically represented in FIG. 6b by means of the line $L_3$ which assumes the value $U_{max}$ for the picture element pe (k, l). pe (k, l) might be the picture element pe (3, 1), namely if there is only one sample corresponding to the binary number 11. According to the invention, the value $U_{max}$ might be assigned to the first picture element in the sub-picture that is being quantized and is represented by the binary number 11. This need not of necessity be the picture element pe (3, 1).

It would alternatively be possible to assign the value $U_{max}$ to more than one of the samples represented by the binary number 11 (if present). It would however be a requirement that the value $U_{max}$ is not assigned to all the samples represented by the binary number 11. It would, for example, be possible to assign the value $U_{max}$ to not more than half of the samples, but it must be assigned to at least one of them.

FIG. 7 shows a receiver in the form of a device for reproducing a digital video signal from a record carrier. FIG. 7 shows a magnetic reading device, which is, for example, suitable for use in a digital video recorder. However, an optical reading device may alternatively be involved, this may be a type of CD video recorder. The device shown in FIG. 7 has a magnetic head 10 for reading from a record carrier 11 the quantized samples of the video signal component in a sub-picture. This record carrier does not only include all the quantized amplitudes of the video signal component in a sub-picture, but additionally the value for $U_{min}$ and $U_{max}$ in the sub-picture or the value for $U_{min}$ and DR in the sub-picture, or the value for $U_{max}$ and DR in the sub-picture.

Let it be assumed that $U_{min}$ and $U_{max}$ are included in a sub-picture in the record carrier. The read device 10 reads the quantized amplitudes $U_Q$ (i, j) (these are the two-bit numbers in the example illustrated in FIGS. 5 and 6) for all the picture elements pe (i, j) from the record carrier 11. These quantized amplitudes $U_Q$ (i, j) are stored in the store 12. The values for $U_{max}$ and $U_{min}$ read from the record carrier 11 are stored in a store 13 and 14, respectively.

Since the values $U_{max}$ and $U_{min}$ are applied by each sub-picture to the receiver, the receiver can determine the dynamic range of the video signal component in each sub-picture, by subtracting these two values from each other. Consequently, similar to what has already been described for the transmitter end, the receiver can determine the curves of FIGS. 3 and 4, so that thereafter the receiver can determine from the dynamic range associated with a sub-picture how many bits p are used to quantize the samples of the video signal component associated with the picture elements in the sub-picture.

The quantized amplitudes associated with the picture elements in the sub-picture are now sequentially applied to a dequantizer 15, a detector 16 and a detector 17. In the dequantizer 15, the samples are dequantized in the manner as described already with reference to the FIGS. 5a and 5b. The output of the dequantizer 15 is coupled to a terminal a of switching means 18 constituted by a controllable three-position switch. The fixed terminal d of this switch is coupled to the output terminal 19. The detector 16 detects the maximum sampled and quantized value for the video signal component in a sub-picture (in the example shown in FIG. 2 this is the two-bit binary number 11) and generates at its output a control signal on detection of the maximum value. This control signal is applied to the control signal input 20 of the switching means 18. The detector 17 detects the minimum sampled and quantized value (in the example of FIG. 6 this is the two-bit binary number 00) for the video signal component in the sub-picture, and at its output generates a control signal on detection of the minimum value. This control signal is applied to the control signal input 21 of the switching means 18. In response to the control signal at the input 20, the switching means 18 perform a switching operation only once in each sub-picture in the position b-d. The output of the store 13 is coupled to the terminal b of these switching means 18, so that at that instant, the value $U_{max}$ is assigned to the amplitude of the video signal component for the relevant picture element which had a quantized value for the video signal component equal to $U_{Qmax}$.

In response to the control signal at the input 21, the switching means 18 switch only once in each sub-picture in the position c-d. The output of the store 14 is coupled to the terminal c of the switching means 18, so that at that instant, the value $U_{min}$ is assigned to the amplitude of the video signal component for the relevant picture element which had a quantized value for the video signal component equal to $U_{Qmin}$. The terminal 19 may be coupled to a unit (not shown) in which the information in the sub-pictures is used for the generation of the pictures assembled from the $N \times M$ sub-pictures.

It will be obvious that the mode of operation of the device shown in FIG. 7 is realized by means of a central control unit (not shown) which provides that the control signals required therefore are applied to the appropriate blocks. Such a control is easy to realize for a person skilled in the art and consequently requires no further explanation.

Should the device be capable of replacing more than one value $U_{Qmax}$ (or $U_{Qmin}$) by $U_{max}$ (or $U_{min}$, respectively) then the fact that, as described in the foregoing, not all the values $U_{Qmax}$ (or $U_{Qmin}$) in a sub-picture are to be replaced by $U_{max}$ (or $U_{min}$, respectively) must be taken into account. Before the values stored in the store 12 are dequantized, it should then first be determined whether there is more than one picture element to which $U_{Qmax}$ (or $U_{Qmin}$) can be assigned.

Let it be assumed that the value $U_{Qmax}$ may be replaced by $U_{max}$ for not more than two picture elements. If there are exactly two picture elements having the value $U_{Qmax}$, then only one of the two values is replaced by $U_{max}$. If there are three or more picture elements having a value $U_{Qmax}$, then two of them can be replaced by $U_{max}$.

The same holds for $U_{Qmin}$ and replacing $U_{Qmin}$ by $U_{min}$ during dequantization.

FIG. 8 shows an embodiment of a two-bit dequantizer suitable for use instead of the dequantizer in the receiver shown in FIG. 7. The dequantizer in FIG. 8 not only produces the amplitudes which were dequantized in known manner, but also supplies itself the maximum and minimum values $U_{min}$ and $U_{max}$, which are to be applied to the respective terminals b and c of the switching means 18.

The value for the dynamic range and value 0 (zero) are applied to the input terminals 30 and 31. These terminals 30 and 31 are coupled to inputs of an adder unit 32, and to the respective terminals 33 and 34 of controllable switching means 35. The output of the adder unit 32 is coupled to a terminal 37 of the switching means 35 via a divide-by-two divider 36. The most significant bit $b_0$ of the two-bit binary number is applied to a control signal input 38 of the switching means 35.

The terminal 39 of the switching means 35 is coupled to an input of an adder unit 41 and to a terminal 42 of controllable switching means 43. The terminal 40 of the switching means 35 is coupled to a second input of the adder unit 41 and to a terminal 44 of the switching means 43. The output of the adder unit 41 is coupled via a divide-by-two divider 45 to a terminal 46 of the switching means 43. The least significant bit $b_1$ of the two-bit binary number is applied to a control signal input 47 of the switching means 43.

A terminal 48 of the switching means 43 is coupled to an input of an adder unit 50 and to the terminal b of the switching means 18. A terminal 49 of the switching means 43 is coupled to an input of the adder unit 50 and to the terminal c of the switching means 18. An output of the adder unit 50 is coupled to the terminal a of the switching means 18 via a divide-by-two divider 53.

The terminal d of the switching means 18 is coupled to the terminal 19 via an adder unit 52. The value $U_{min}$ is applied to a second input of the adder unit 52 via the terminal 54. If a logic value "0" is applied to the terminal 38 or to the terminal 47, then the switching means are in the position shown in the drawing. If a logic value "1" is applied to the terminals, then the switching means are in the position indicated by means of the broken lines. The Table in FIG. 9 indicates which signals will be present across the terminals a, b and c of the switching means 18 when the two-bit binary number $b_0$, $b_1$ is applied. In response to the control signal applied to the control signal input 20, the switching means 18 choose for the binary number 11 from the value DR or the value 7DR/8. In response to the control signal applied to the control signal input 21, the switching means 18 choose for the binary number 00 from the value DR/8 or the value 0. The values applied by the switching means 18 to the adder 52 are consequently represented by the values in the boxed portion 60 in the Table of FIG. 9. In the adder 52, $U_{min}$ is added to these values, so that the appropriate dequantized amplitudes appear at the output 19.

The dequantizer of FIG. 8 is even suitable to provide dequantization of 1-bit numbers. The 1-bit binary number is then applied to the terminal 47 and the switching means 35 are then in a position in which the terminals 34 and 40 are interconnected and the terminals 33 and 39 are interconnected.

It should be noted that the invention is not limited to only the embodiment described. The invention is also suitable for use in those embodiments which differ from the shown embodiment in only those respects which do not relate to the inventive idea.

I claim:

1. A method of transmitting a digital video signal via a transmission medium, comprising a transmitter for transmitting and a receiver for receiving the digital video signal, in the transmitter:

each picture of consecutive pictures of $N \times M$ picture elements being sub-divided into sub-pictures, a sub-picture being assembled from $n \times m$ picture elements, it holding for the product of n and m that it is greater than or equal to 4, for a sub-picture and for a video signal component associated with each one of the picture elements in the sub-picture, the maximum value and the minimum value that this video signal component has in the sub-picture being determined for obtaining the dynamic range of the video signal component for the picture elements in the sub-picture, the amplitudes of the video signal component in the sub-picture all being quantized by a given number of p bits by subdividing the dynamic range into $2^p$ of at least approximately equal sub-ranges, the quantized amplitudes of the video signal component for all of the picture elements in the sub-picture and information about the minimum value and the maximum value of the video signal component in the sub-picture being applied to the transmission medium for transmission via the transmission medium, in the receiver:

the information about the maximum and minimum values of the video signal component in the sub-picture, and the quantized amplitudes of the video signal component for all of the picture elements in the sub-picture being received, the quantized amplitudes of the video signal component in the sub-picture being dequantized, the video information for consecutive pictures of $N \times M$ picture elements being derived from consecutive sub-picture, characterized in that, in the receiver during dequantization of the quantized amplitudes of the video signal component associated with the $n \times m$ picture elements in the sub-picture, for at least one of the picture elements for which the video signal component has the highest quantized amplitude, and in the event there are two or more picture elements for which the video signal components has the highest quantized amplitude, not for all those picture elements, this quantized amplitude is, upon dequantization, set equal to the maximum value of the video signal component in the sub-picture, and for at least one of the picture elements for which the video signal component has the lowest quantized amplitude, and in the event that there are two or more picture elements for which the video signal component has the lowest quantized amplitude, not for all of those picture elements, this quantized amplitude is, upon dequantization, set equal to the minimum value of the video signal component in the sub-picture.

2. A method as claimed in claim 1, characterized in that in the receiver during dequantization of the quantized amplitudes of the video signal component associated with the $n \times m$ picture elements in the sub-pictures, the amplitude for the video signal component of just one picture element having the largest quantized amplitude, is, on dequantization, set equal to the maximum value of the video signal component in the sub-picture, and that for just one of the picture elements for which the video signal component has the lowest quantized amplitude, the amplitude for the video signal component for that picture element is set equal, on dequantization, to the minimum value of the video signal component in the sub-picture.

3. A receiver for use in a transmission system for transmitting a digital video signal via a transmission medium, said transmission system including a transmitter for transmitting and at least one receiver for receiving the digital video signal, in which in the transmitter:

each picture of consecutive pictures of $N \times M$ picture elements being sub-divided into sub-pictures, a sub-picture being assembled from $n \times m$ picture elements, wherein the product of n and m is greater than or equal to 4, for a sub-picture and for a video signal component associated with each one of the picture elements in the sub-picture, the maximum value and the minimum value that this video signal component has in the sub-picture being determined for obtaining the dynamic range of the video signal component for the picture elements in the sub-picture, the amplitudes of the video signal component in the sub-picture all being quantized by a given number of p bits by sub-dividing the dynamic range into $2^p$ of at least approximately equal sub-ranges, the quantized amplitudes of the video signal component for all of the picture elements in the sub-picture and information about the minimum value and the maximum value of the video signal component in the sub-picture being applied to the transmission medium for transmission via the transmission medium, and in which in the receiver:

the information about the maximum and minimum values of the video signal component in the sub-picture, and the quantized amplitudes of the video signal component for all of the picture elements in the sub-picture being received, the quantized amplitudes of the video signal component in the sub-picture being dequantized, the video information for consecutive pictures of $N \times M$ picture elements being derived from consecutive sub-pictures, wherein, in the receiver during dequantization of the quantized amplitudes of the video signal component associated with the $n \times m$ picture elements in the sub-picture, for at least one of the picture elements for which the video signal component has the highest quantized amplitude, and in the event that there are two or more picture elements for which the video signal component has the highest quantized amplitude, not for all of those picture elements, this quantized amplitude is, upon dequantization, set equal to the maximum value of the video signal component in the sub-picture, and for at least one of the picture elements for which the video signal component has the lowest quantized amplitude, and in the event that there are two or more picture elements for which the video signal component has the lowest quantized amplitude, not for all of those picture elements, this quantized amplitude is, upon dequantization, set equal to the minimum value of the video signal component in the sub-picture, said receiver comprising:

a receiving unit for receiving the information about the maximum value and the minimum value of the video signal component in the sub-picture, and the quantized amplitudes of the video signal component for all of the picture elements in the sub-picture;

a dequantizer for dequantizing the quantized amplitudes of the video signal component for the $n \times m$ picture elements in the sub-picture; and a processing unit for deriving consecutive pictures of $N \times M$ picture elements from consecutive sub-pictures, characterized in that, for dequantization of the quantized amplitudes for the $n \times m$ picture elements in the sub-picture, the dequantizer comprises:

first means for assigning, on dequantization, to at least one of the picture elements, for which the quantized video signal component has the highest quantized amplitude, but not to all of those pictures elements having the highest quantized amplitude, an amplitude for the video signal component equal to the maximum value of the video signal component in the sub-picture; and second means for assigning, on dequantization, to at least one of the picture elements, for which the video signal component has the lowest quantized amplitude, but not to all of those picture element having the lowest quantized amplitude, an amplitude for the video signal component equal to the minimum value of the video signal component in the sub-picture.

4. A receiver as set forth in claim 3, characterized in that in said quantizer, said first assigning means assigns, for the video signal component, an amplitude equal to the maximum value of the video signal component in the sub-picture for just one picture element having the largest quantized amplitude, and said second assigning means assigns, for the video signal component, an amplitude equal to the minimum value of the video signal component in the sub-picture for just one picture element having the lowest quantized amplitude.

5. A receiver as claimed in claim 3 or 4, characterized in that the receiver is constituted by an arrangement for reproducing a digital video signal from a record carrier, and that receiver unit is provided with a read device for reading the video signal from a track on the record carrier.

6. A receiver as claimed in claim 5, characterized in that the receiver is constituted by an arrangement for reproducing a digital video signal from a magnetic record carrier, and that the read device includes a read head.

* * * * *